Sept. 26, 1967  P. F. G. HOLST  3,344,422
MISS DISTANCE INDICATOR

Filed Sept. 26, 1966  2 Sheets-Sheet 1

INVENTOR.
PAUL F. G. HOLST
BY
ATTORNEYS.

United States Patent Office 3,344,422
Patented Sept. 26, 1967

3,344,422
MISS DISTANCE INDICATOR
Paul F. G. Holst, Richmond, Ind., assignor to Avco Corporation, Richmond, Ind., a corporation of Delaware
Filed Sept. 26, 1966, Ser. No. 582,148
1 Claim. (Cl. 343—12)

ABSTRACT OF THE DISCLOSURE

This miss distance indicator is installed in a missile. A radio frequency signal source is coupled to an omnidirectional antenna system, comprising a plurality of antennas, through a circulator and power divider. The circulator provides isolation between this source and a mixer as to prevent interference with the reception of echo signals, i.e., Doppler frequency shift signals, via the same antennas, power divider and circulator. The Doppler frequency output of the mixer is amplified by an amplifier having a pass band defined by the highest anticipated Doppler frequency and 10% thereof. The miss distance is derived from the amplifier output signals.

---

The use of ground to air or air to air rockets and missiles as interceptors against moving targets represents state-of-the-art technologies. The present invention provides useful information, in cases where a near miss is experienced, to determine the distance of closest approach between the interceptor and the target.

The present invention relates to improved Doppler radar systems and methods, and more specifically to a novel means and method for indicating the miss distance between two objects in a specific encounter. In accordance with the invention a radio frequency source is employed to radiate a signal from an interceptor. This signal is reflected from a target in space. The resulting Doppler frequency is proportional to the relative velocity between the interceptor and the target. The radio frequency being known, it will be shown that the variation in Doppler frequency as a function of time may be used to uniquely indicate the miss distance. To provide miss distance information, the instantaneous value of the Doppler frequency is therefore telemetered to a ground observing station where it is recorded as a function of elapsed time. The miss distance is the minimum distance between interceptor and target which is experienced during the encounter.

The principal object of the invention is to provide a miss distance indicating method which is based on a clarified appreciation of the fact that Doppler frequency variation uniquely indicates miss distance, that appreciation being based on assumptions which have been found to be valid for all practical purposes.

Another object of the invention is to provide an improved miss distance indicator in which the radiating source is carried by the interceptor and in which the miss distance intelligence is telemetered to an observing station.

A further object of the invention is to provide a miss distance indicator using simplified equipment which more advantageously eliminates the problem presented by unintentional leakage between the transmit and receive system on the interceptor.

For a better understanding of the invention, together with other and further objects, advantages, and capabilities thereof, reference is made to the following description of the accompanying drawings in which.

The present invention makes certain assumptions which have been verified for all practical purposes. It assumes that the paths for both target and interceptor are straight lines during the interval of time involved in measuring the miss distance. In other words, the invention assumes that the actual paths of the target and the interceptor may be replaced with their respective tangents without significant detriment to the accuracy of miss distance determination.

The time interval during which miss distance measurement data can be made depends on the sensitivity of the system making the measurements, i.e., the lowest level signals which can be received and processed, and the relative velocity between target and interceptor. Any deviations of the motions of those bodies from straight line paths during this time interval are caused by accelerations resulting from forces normal to the respective paths. Deviations from straight line paths may be determined as the time integral of acceleration during the time involved in miss distance measurement. Based on the characteristics and the history of the mission, it can be determined whether or not significant deviations from the assumed straight lines are present in particular instances. It has been found, however, that with a high degree of statistical confidence the incidental curvatures in the paths can be neglected.

Now consider a target and an interceptor moving in straight lines on non-collision courses. This invention exploits the fact that bodies moving in straight lines always move in parallel planes.

Figure 1:
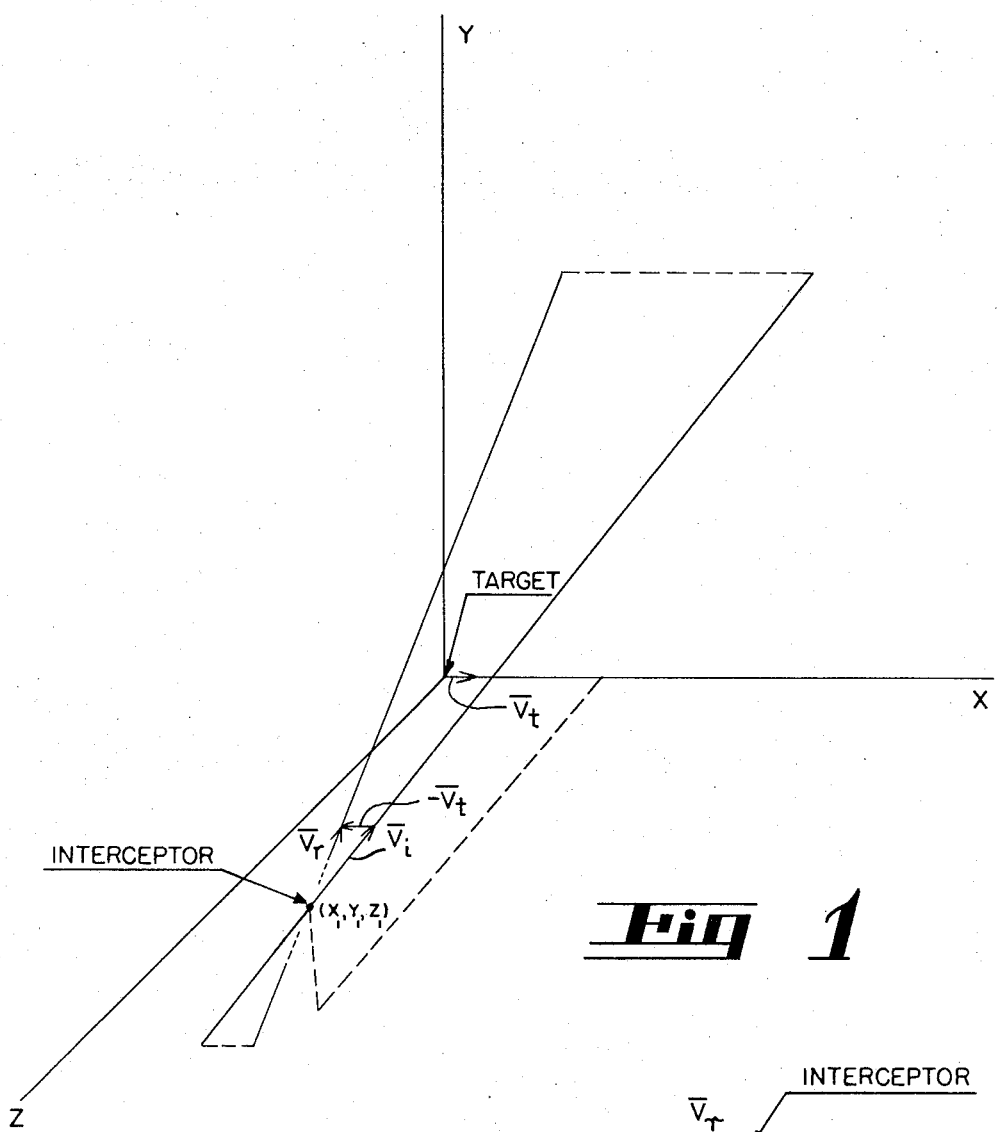
FIG. 1 is an explanatory figure diagram used in explaining the intercept geometry.

Referring now to FIG. 1, an interceptor, starting at the time it starts "looking at" a target, is at $(x_1, y_1, z_1)$ and moves with a vectorial velocity $\overline{V}_i$. A target is located at $(0, 0, 0)$ and moves with a vectorial velocity $\overline{V}_t$ along the X-axis. If a velocity of $-V_t$ is added to both the target and the interceptor, then the relative velocity $V_r$ will not change. This may also be expressed by stating that the reference coordinate system is moving with a velocity $\overline{V}_t$. Referencing the new moving coordinate system, the target will be standing motionless at $(0, 0, 0)$ and the net result is that an interceptor at $(x_1, y_1, z_1)$ is effectively moving with a vectorial velocity $\overline{V}_r$. The discussion of FIG. 1 distills down to a showing that the conditions prevailing when a target is moved may be reduced down to the consideration of a stationary target and an interceptor passing by on a straight-line course with constant velocity $\overline{V}_r$.

Figure 2:
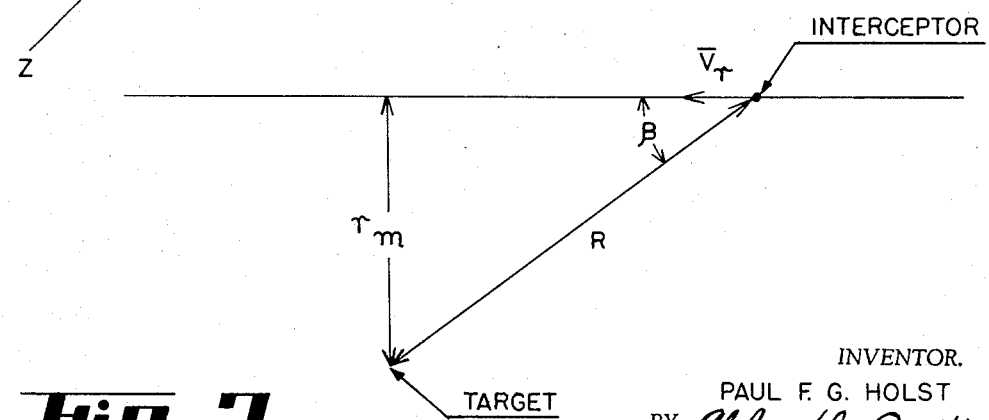
FIG. 2 is a simplified figure directed to the same end.

Referring now to FIG. 2, a plane is established by the points $(0, 0, 0)$, $(x_1, y_1, z_1)$ and the velocity $\overline{V}_r$. In this plane $r_m$ is the miss distance, R is the range between interceptor and targets, and beta is the angle of intercept. On the stipulation that the nearest approach between interceptor and target is reached at time $t=0$, then $$R = \sqrt{r_m^2 + (V_r t)^2}$$

for both negative and positive values of $t$, i.e., before and after intercept.

The significant quantity is rate of change of range, expressed as $\dot{R}$. As the interceptor approaches the target its rate of change of range is in one direction. As the interceptor departs from the target its rate of change is in the other direction, and at the instant of nearest approach to the target its rate of change of range is zero.

It will now be demonstrated that the rate of change of range $\dot{R}$ is a cosine function of the angle of intercept:

$$\dot{R} = \frac{dR}{dt} = \frac{d\sqrt{r_m^2 + (V_r \cdot t)^2}}{dt} = \frac{1}{2} \cdot \frac{1}{\sqrt{r_m^2 + (V_r \cdot t)^2}} \cdot \frac{d(r_m^2 + (V_r \cdot t)^2)}{dt}$$

$$= \frac{1}{2} \cdot \frac{1}{\sqrt{r_m^2 + (V_r \cdot t)^2}} \cdot 2V_r^2 t = \frac{V_r^2 t}{R} = V_r \cdot \cos\text{ beta}$$

It has thereby been proved that $\dot{R} = V_r \cos\text{ beta}$.

$\dot{R}$ is the velocity of the interceptor relative to the target. Expressing R in other terms:

$$R = \frac{V_r^2 t}{\dot{R}}$$

It follows from what has already been shown that:

$$r_m = \sqrt{R^2 - (V_r t)^2}$$

Substituting the above derived expression for R in the last-mentioned equation, the final solution for $r_m$ is as follows:

$$r_m = \sqrt{\frac{V_r^4 \cdot t^2}{\dot{R}^2} - (V_r t)^2} = V_r \cdot t \cdot \sqrt{\frac{V_r^2}{\dot{R}^2} - 1} \quad (1)$$

Equation 1 expresses $r_m$ as a function of three variables. If these variables are known, then $r_m$ can be determined. It will be shown that this requirement can be reduced to determine a limited number of Doppler frequencies as a function of elapsed time.

Assuming that the miss distance indicator is arranged to transmit and receive an RF (radio frequency) signal of a known frequency, then the physical concept denoted as the Doppler frequency is defined as the difference in frequency between the transmitted and received frequencies. The Doppler frequency will uniquely determine $\dot{R}$ and may be used to establish a miss distance indication if an antenna system is provided which will radiate a signal into all areas where a target might be found.

The Doppler frequency is a measure of range rate $\dot{R}$, because $$f_d (\text{i.e. the Doppler shift}) = \frac{2 \cdot F \cdot \dot{R}}{C}$$

where F is the transmitter frequency and C is the velocity of light.

A CW Doppler system, due to its inherent simplicity, has been considered superior to a pulse Doppler system since range calculations show, using standard radar formulas, that a range of 500 feet is possible against an $1m^2$ target (i.e. one having a radar cross section of one square meter) using a one-watt oscillator.

Figure 4:
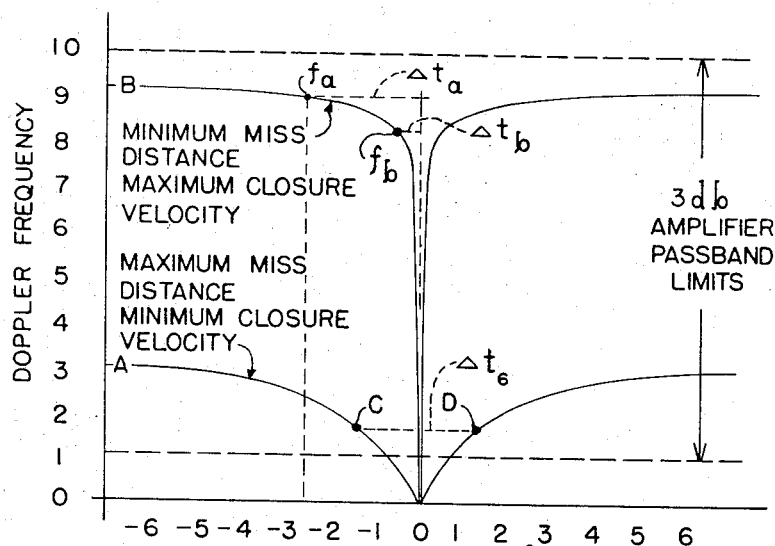
FIG. 4 is a set of detected Doppler signal characteristic curves defining the Doppler frequencies and employed as an aid in describing the operation of the invention.

Referring now specifically to FIG. 4, it shows, on a framework of Cartesian coordinates, graphs of Doppler frequency versus time. From what has already been demonstrated it will be understood that graphs of $V_r \cos\text{ beta}$ and graphs of Doppler frequency are identical in form, both being functions of $\dot{R}$. The curve B in FIG. 4 characterizes the case in which the miss distance between interceptor and target is very small and in which the closure velocity is very large. On the other hand the curve A in FIG. 4 characterizes the case in which the miss distance is very large and closure velocity is very small. The ordinates in FIG. 4 are Doppler frequencies and the abscissae are periods of time. The scales for the frequencies and the periods of time are arbitrary. The curves A and B are plotted on different time bases because of the wide variation between the conditions that they indicate. Knowing the time interval between two positive portions of the miss distance indicator output, the miss distance can readily be calculated, assuming an accurate determination of the closing velocity $\overline{V}_r$.

Parenthetically, the curves of FIG. 4 are computed from the classic equation for the Doppler frequency and from the expression for $r_m$ given in Equation 1 above.

If the Doppler frequency curve is known to an extent which will permit accurate determination of the relative closure velocity $\overline{V}_r$ then the time interval between the occurrence of the decreasing and increasing 6 db points in the Doppler frequency curve offers a convenient measure of the miss distance.

Defining the 6 db time interval $\Delta t_6$ as the points where the Doppler frequency has been reduced to one half its maximum value, it can readily be shown that the miss distance is $$\tfrac{1}{2} \cdot \sqrt{3} \cdot V_r \cdot \Delta t_6$$

To provide proof of the last-mentioned equation, the following approach will serve: The 6 db points are those points where the relative velocity has dropped to $\tfrac{1}{2} V_r$ which will reduce the Doppler frequency by a factor of 2 to 1. Referencing Equation 1 above, insert $\dot{R} = \tfrac{1}{2} V_r$ and find for the point of closest approach ($t=0$):

$$r_m = V_r (\tfrac{1}{2} \Delta t_6) \cdot \sqrt{4-1} = \tfrac{1}{2} \cdot V_r \sqrt{3} \cdot \Delta t_6 \quad (2)$$

It has now been shown how the measurement of the miss distance consists in simply measuring the time interval $\Delta t_6$ between two points such as C and D on curve B, FIG. 4, at which the Doppler frequency has dropped to one half of its maximum frequency $2FV_r/C$ and then applying Equation 2 above. This discussion postulates that $V_r$ is known and as a general rule $V_r$ is readily available from the intercept characteristics. However, if the maximum range is large compared to the miss distance, then the maximum Doppler frequency may be determined as the Doppler frequency at the beginning and the end of the measurement interval.

Let it now be supposed that $V_r$ is not known with sufficient accuracy. Let it further be assumed that $\Delta t_a$ and $\Delta t_b$ are the time intervals between the occurrence of the two Doppler frequencies $f_a$ and $f_b$ as measured to the time of closest approach. By way of example, the two selected frequency are occurring prior to the reference time. If it is stipulated that $$G = \frac{\Delta t_a}{\Delta t_b}$$

$$D = \frac{f_a}{f_b} = \frac{\dot{R}_a}{\dot{R}_b}, \text{ since } f_a = \frac{2F \cdot \dot{R}_a}{C} \text{ and } f_b = \frac{2F \dot{R}_b}{C}$$

$r_m$ may be found as $$r_m = \Delta t_a \cdot \dot{R}_a \cdot \frac{\sqrt{(1-G^2) \cdot (1-D^2)}}{D^2 - G^2}$$

since:

$$r_m = V_r \cdot \Delta t_a \sqrt{\frac{V_r^2}{\dot{R}_a^2} - 1}$$

$$r_m = V_r \cdot \Delta t_b \sqrt{\frac{V_r^2}{\dot{R}_b^2} - 1} = V_r \cdot \frac{\Delta t_a}{G} \cdot \sqrt{\frac{V_r^2}{\dot{R}_a^2} \cdot D^2 - 1}$$

hence:

$$\sqrt{\frac{V_r^2}{\dot{R}_a^2} - 1} = \frac{1}{G} \cdot \sqrt{\frac{V_r^2}{\dot{R}_a^2} \cdot D^2 - 1}$$

$$\frac{V_r^2}{\dot{R}_a^2} - \frac{V_r^2}{\dot{R}_a^2} \cdot \frac{D^2}{G^2} = 1 - \frac{1}{G^2} \text{ or } \frac{V_r^2}{\dot{R}_a^2} = \frac{1 - G^{1/2}}{1 - \frac{D^2}{G^2}}$$

or:

$$r_m = \dot{R}_a \cdot \Delta t_a \cdot \sqrt{\frac{G^2 - 1}{G^2 - D^2}} \cdot \sqrt{\frac{G^2 - 1}{G^2 - D^2} - 1}$$

$$= \dot{R}_a \cdot \Delta t_a \frac{\sqrt{(1-G^2) \cdot (1-D^2)}}{D^2 - G^2}$$

The above formulas are only to be considered as representative. Others may be developed to fit any given set of Doppler frequency data.

Figure 3:
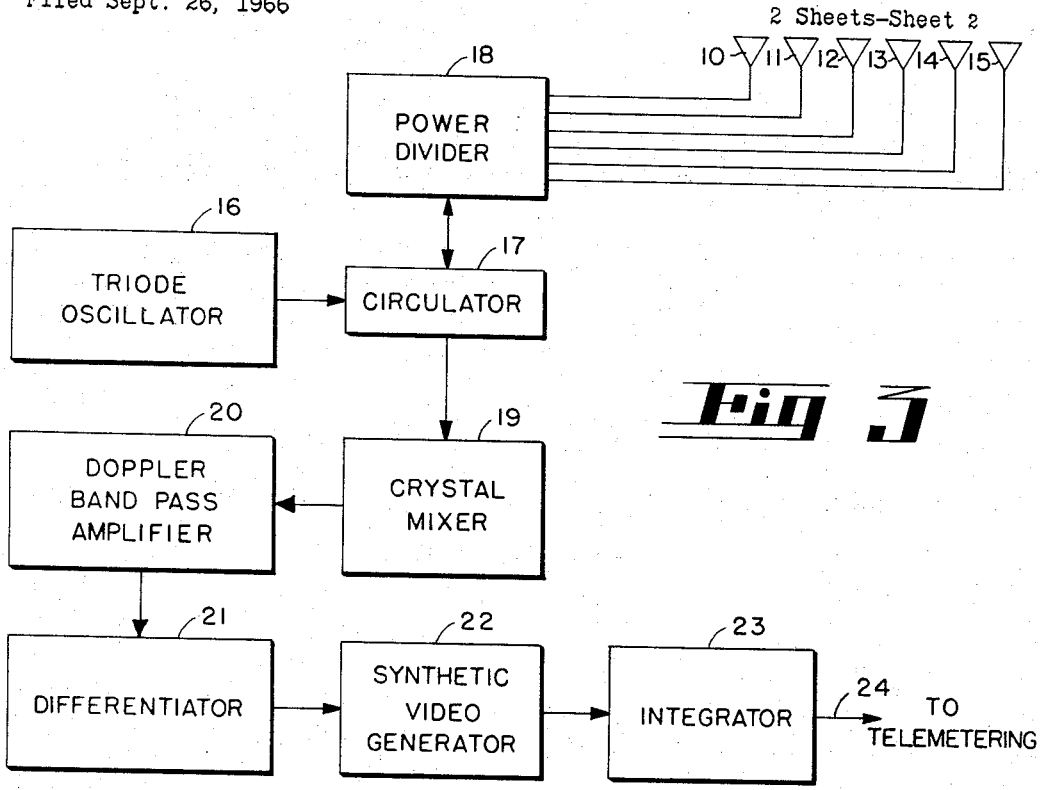
FIG. 3 is a schematic diagram, generally in block form, of the miss distance indicating equipment mounted on the interceptor.

The equipment illustrated in FIG. 3 is located on the interceptor. Multiple antennas 10, 11, 12, 13, 14, and 15 provide omnidirectional radiation. In the continuous wave Doppler system (herein illustrated) a triode oscillator 16 is employed as the radio frequency signal source. The output of the triode oscillator 16 is coupled to an input of a circulator 17 and an output of the circulator is coupled through a power divider 18 to the antennas 10–15, thereby to radiate a continuous radio frequency signal of 1.5 gigacycle frequency, for example; a suitably attenuated output of the circulator is coupled to a crystal mixer 19. The circulator provides isolation between the radio frequency source 16 and the crystal mixer 19, so that the transmitting function will not interfere with the reception of echo signals via the antennas 10–15, power divider 18, circulator 17, and mixer 19.

The output of the crystal mixer is coupled to a Doppler amplifier 20 which has a pass band including the highest anticipated Doppler frequency and, by way of example, 10% of highest anticipated Doppler frequency. The output of the amplifier 20 is coupled to a differentiator 21 in order to convert the Doppler signal to trigger pulses at the Doppler rate. In order to process these trigger pulses into a train of pulses of constant amplitude and width, the output of the differentiator 21 is coupled to a synthetic video or audio signal generator 22, and the output of generator 22 is coupled to an integrator or detector 23, which is utilized to construct the detected Doppler curves illustrated in FIG. 4, the circuitry being arranged so that the output is directly proportional to the Doppler frequency. The detected output may be telemetered to ground as indicated at 24, however, it is also possible to telemeter the output of the synthetic video generator 22 directly to ground.

At the ground station the telemetered signal is recorded against time utilizing recording devices within the scope of the art. Such recordings permit reduction of the data at any later time as desired.

When a target is within the range of the miss distance indicating system of FIG. 3 the echo energy is received at the antenna system 10–15, summed at the power divider 18 and applied to the mixer via the circulator 17. The Doppler component of the received energy is produced when the target echo signal is heterodyned with the local oscillator signal. The Doppler signal is amplified in amplifier 20. Parenthetically, the ferrite circulator 17 permits the same antenna to be used for both transmitting and reception.

The crystal mixer 19 is single ended and therefore the FIG. 4 system is quite simple.

The Doppler pass band amplifier 20 provides sufficient gain for a minimum detectable Doppler signal to produce a saturated output for signals within the range defined by the maximum Doppler frequency rate and one-tenth of such rate. The output signal of the amplifier is of constant amplitude and varying frequency.

When a miss is anticipated the detected Doppler frequency diminishes in accordance with the angle between the line of sight from target to interceptor and the relative trajectory, this angle being referred to as beta. The detected Doppler signal, which first diminishes and thereafter increases in frequency, is amplified and differentiated in order to provide a train of trigger pulses at the received Doppler rate. The train of positive pulses from the differentiator 21 triggers a synthetic video generator 22 which may comprise a multi-stable vibrator, so as to produce a train of pulses of constant amplitude and constant width. The integrator 23 may have a time constant of approximately twice the minimum Doppler frequency and integrates the video pulse output of generator 22 to derive an output voltage proportional to the video pulse rate of generator 22. The output of integrator 23 at 24 will be coupled to a telemetering transmitter (not shown) as a modulation signal.

It has been shown that knowledge of the Doppler frequency variation against time may be used to uniquely define the miss distance. The procedure is the same whatever method is used to telemeter the Doppler frequency to the ground.

First, the Doppler frequencies are determined as a function of time.

Second, formulas like those shown in this specification or derivatives are used to compute the miss distance. The last-mentioned formula given above becomes indeterminate for the conditions under which $$\frac{\Delta t_a}{\Delta t_b} = \frac{f_a}{f_b} = \frac{\dot{R}_a}{\dot{R}_b} = 1$$

or $$\Delta t_a = f_a = \dot{R}_a = 0$$

or $$\Delta t_b = f_b = \dot{R}_b = 0$$

and the formula therefore is subject to that limitation, which is easily avoided in practice.

Referring to FIG. 4, the expression $\Delta t_a$ signifies the time difference between zero and the time of occurrence of $f_a$. It will be understood that the expression $\Delta t_b$ is the time difference between zero and the time of occurrence of $f_b$.

While there has been shown and described what is considered the preferred embodiment of the invention, it will be obvious to those skilled in the art that various changes and modifications may be made therein without departing from the scope of the invention as defined by the appended claim.

I claim:

In a system for measuring the miss distance between an interceptor and a target, the combination comprising:
  a source of continuous wave energy to be radiated,
  a power divider,
  a circulator intercoupling said source and said power divider,
  a plurality of antennas coupled to said power divider and providing an omnidirectional pattern whereby echo energy is returned to said antennas from a target within said pattern,
  said plurality of antennas being employed as a common antenna system to intercept echo energy from the target,
  a mixer,
  said circulator intercoupling the mixer and the power dividers whereby the mixer derives Doppler frequency shift signals which are a function of the rate of change of range of the interceptor relative to the target,
  means for amplifying said Doppler frequency shift signals,
  said amplifying means having a pass band within the range defined by the maximum Doppler frequency rate and one-tenth of said rate,
  and means for deriving a miss distance indication from the output of said amplifier.

References Cited

UNITED STATES PATENTS

| | | | |
|---|---|---|---|
| 3,029,426 | 4/1962 | Robinson | 343—12 |
| 3,256,519 | 6/1966 | Dewey et al. | 343—12 |
| 3,289,204 | 11/1966 | Murray et al | 343—12 |
| 3,305,864 | 2/1967 | Ghose | 343—100.6 |

RODNEY D. BENNETT, *Primary Examiner.*

J. P. MORRIS, *Assistant Examiner.*